US007774360B2

(12) United States Patent
Sun et al.

(10) Patent No.: US 7,774,360 B2
(45) Date of Patent: Aug. 10, 2010

(54) BUILDING BRIDGES FOR WEB QUERY CLASSIFICATION

(75) Inventors: Jian-Tao Sun, Beijing (CN); Dou Shen, Beijing (CN); Qiang Yang, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 11/799,223

(22) Filed: May 1, 2007

(65) Prior Publication Data

US 2008/0065624 A1  Mar. 13, 2008

Related U.S. Application Data

(60) Provisional application No. 60/843,024, filed on Sep. 8, 2006.

(51) Int. Cl.
*G06F 7/00* (2006.01)
*G06F 17/30* (2006.01)
(52) U.S. Cl. .................................. 707/776; 707/777
(58) Field of Classification Search ............ 707/1–10, 707/100–104.1, 200–206
See application file for complete search history.

(56) References Cited

U.S. PATENT DOCUMENTS

| | | | |
|---|---|---|---|
| 6,434,549 | B1 | 8/2002 | Linetsky et al. |
| 6,772,148 | B2 | 8/2004 | Baclawski |
| 6,778,979 | B2 | 8/2004 | Grefenstette et al. |
| 6,963,867 | B2 | 11/2005 | Ford et al. |
| 7,089,226 | B1 | 8/2006 | Dumais et al. |
| 7,143,066 | B2 | 11/2006 | Shear et al. |
| 2004/0260677 | A1 | 12/2004 | Malpani et al. |
| 2005/0149496 | A1 | 7/2005 | Mukherjee et al. |
| 2005/0234953 | A1* | 10/2005 | Zhang et al. ............... 707/101 |
| 2006/0161545 | A1 | 7/2006 | Pura |
| 2006/0190439 | A1 | 8/2006 | Chowdhury et al. |

OTHER PUBLICATIONS

David A Hull et al., Method combination for document filtering, 1996, ACM, 279-287.*
Joon Ho Lee, Analyses of multiple evidence combination, 1997, ACM, 267-276.*
Beitzel, et al., "Automatic Web Query Classification Using Labeled and Unlabeled Training Data", Date: 2005, pp. 581-582, ACM Press, New York, USA, http://delivery.acm.org/10.1145/1080000/1076138/p581-beitzel.pdf? key1=1076138&key2=5966887611 &coll=GUIDE&dl=GUIDE&CFID=10509516 &CFTOKEN=31676319.
Kang, et al., "Query Type Classification for Web Document Retrieval", Date: 2003, pp. 64-71, ACM Press, New York, USA, http://delivery.acm.org/10.1145/870000/860449/p64-kang.pdf? key1=860449&key2=6306887611&coll=GUIDE&dl=GUIDE &CFID=8269911&CFTOKEN=19209486.

(Continued)

*Primary Examiner*—Jean B Fleurantin (57) ABSTRACT

Described is a technology by which an intermediate taxonomy is processed (e.g., offline) with respect to a target taxonomy to determine relationship values between categories represented in the intermediate taxonomy and the target taxonomy. The relationship values are used to construct a bridging classifier for use in online query processing to relate queries to categories in the target taxonomy. The relation is based on each target category's relationship to one or more categories that were represented in the intermediate taxonomy. Further, only a relevant subset of the categories represented in the intermediate taxonomy may be chosen for use in the bridging classifier, e.g., based on relative probability scores and/or mutual information scores computed between the categories represented in the intermediate taxonomy and categories in the target taxonomy.

10 Claims, 5 Drawing Sheets

OTHER PUBLICATIONS

Shen, et al., "Q2C@UST: Our Winning Solution to Query Classification in KDDCUP 2005", Date: Dec. 2005, pp. 100-110, vol. 7, Issue 2, ACM Press, New York, USA, http://delivery.acm.org/10.1145/1120000/1117467/p100-shen.pdf?key2=7136887611&coll=GUIDE&dl=GUIDE&CFID=10509159&CFTOKEN=70036158.key1=1117467

* cited by examiner

BUILDING BRIDGES FOR WEB QUERY CLASSIFICATION

BACKGROUND

Web searching has become an indispensable tool for web users to locate desired information, particularly as the amount of information that is available on the Internet continues to rapidly increase. To submit a query, web users typically submit a few words to a search engine. However, because these queries are short and often ambiguous, interpreting the queries in terms of a set of target categories is a difficult problem. For example, the users issuing a Web query "apple" might expect to see Web pages related to the fruit apple, or they may prefer to see products or news related to the music record label or the computer company.

In general, the various problems and solutions related to interpreting web queries in terms of categories along a taxonomy are referred to as query classification. In general, a taxonomy comprising hierarchically arranged categories is used to process a web query into results. For example, online advertisement services rely on query classification results to promote different products more accurately. Search result pages can be grouped according to the categories predicted by a query classification algorithm.

Previous solutions for query classification generally needed human-labeled training data. However, it is a very difficult and time consuming task to provide enough training examples, especially when the target taxonomy is complicated. Another potential problem related to the training data is caused by the ongoing changes in the query stream, which makes it hard to systematically cover the space of queries. For example, if changes are made to a defined taxonomy, re-training is needed to handle the changes.

In another previous type of solution, an input query is first mapped to an intermediate category, and then a second mapping is applied to map the query from the intermediate category to a target category. However, this method suffers from a number of problems. One problem is that the classifier for the second mapping function needs to be trained whenever the target category structure changes. Because in real applications the target categories often change depending on the needs of the service providers, as well as the distribution of the web contents, this re-training solution is not sufficiently flexible. Another problem with this solution is that the Open Directory Project (ODP) taxonomy, in which web content is classified by human volunteers, is used as the intermediate taxonomy. However, because the ODP contains more than 590,000 different categories, it is also costly to handle the mapping operations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an intermediate taxonomy is processed (e.g., offline) with respect to a target taxonomy to determine relationship values between categories represented in the intermediate taxonomy and categories represented in the target taxonomy. The relation values may then be used to provide a bridging classifier for use in an online query processing state that relates a query to at least one category represented in the target taxonomy. The relation is based on each target category's relationship to one or more categories that were represented in the intermediate taxonomy.

Because the categories of a target taxonomy (e.g., directed towards online advertising) may not be very relevant to many of the categories in the (likely very large) intermediate taxonomy, only a subset of the categories represented in the intermediate taxonomy may be chosen for use in the bridging classifier. The subset of chosen categories in the intermediate taxonomy may be based on their relevance to categories represented in the target taxonomy. For example, the subset may be based on relative probability scores computed between the categories represented in the intermediate taxonomy and categories in the target taxonomy. In an alternative example, the subset may be based on mutual information scores computed between the categories represented in the intermediate taxonomy and categories in the target taxonomy.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a query classification mechanism (e.g., including an algorithm) that builds a bridging classifier from an (e.g., existing) intermediate taxonomy. The bridging classifier may then be used in an online query-processing mode to map users' queries to one or more target categories of a target taxonomy (e.g., defined for a certain task such as online advertising). The bridging classifier may be built offline with respect to online query processing. Moreover, instead of re-training, the bridging classifier may be rebuilt using mathematical computations any time the target taxonomy/categories change. Classifiers may thus be trained once for use in future query classification tasks, even when the target categories are different.

Further described is a category-selection mechanism that selects a subset of categories in the intermediate taxonomy, improving the effectiveness and efficiency of online classification. To this end, as described below, only a portion of the most relevant parts of the intermediate categories with respect to target categories are selected for use by the bridging classifier.

As will be understood, various examples are shown that facilitate query classification for an example target taxonomy (e.g., related to online advertising) using an example intermediate taxonomy, such as one that already exists. However, these are only non-limiting examples for the purposes of describing the various concepts and aspects of the technology described herein. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing and query processing technology in general.

Figure 1:
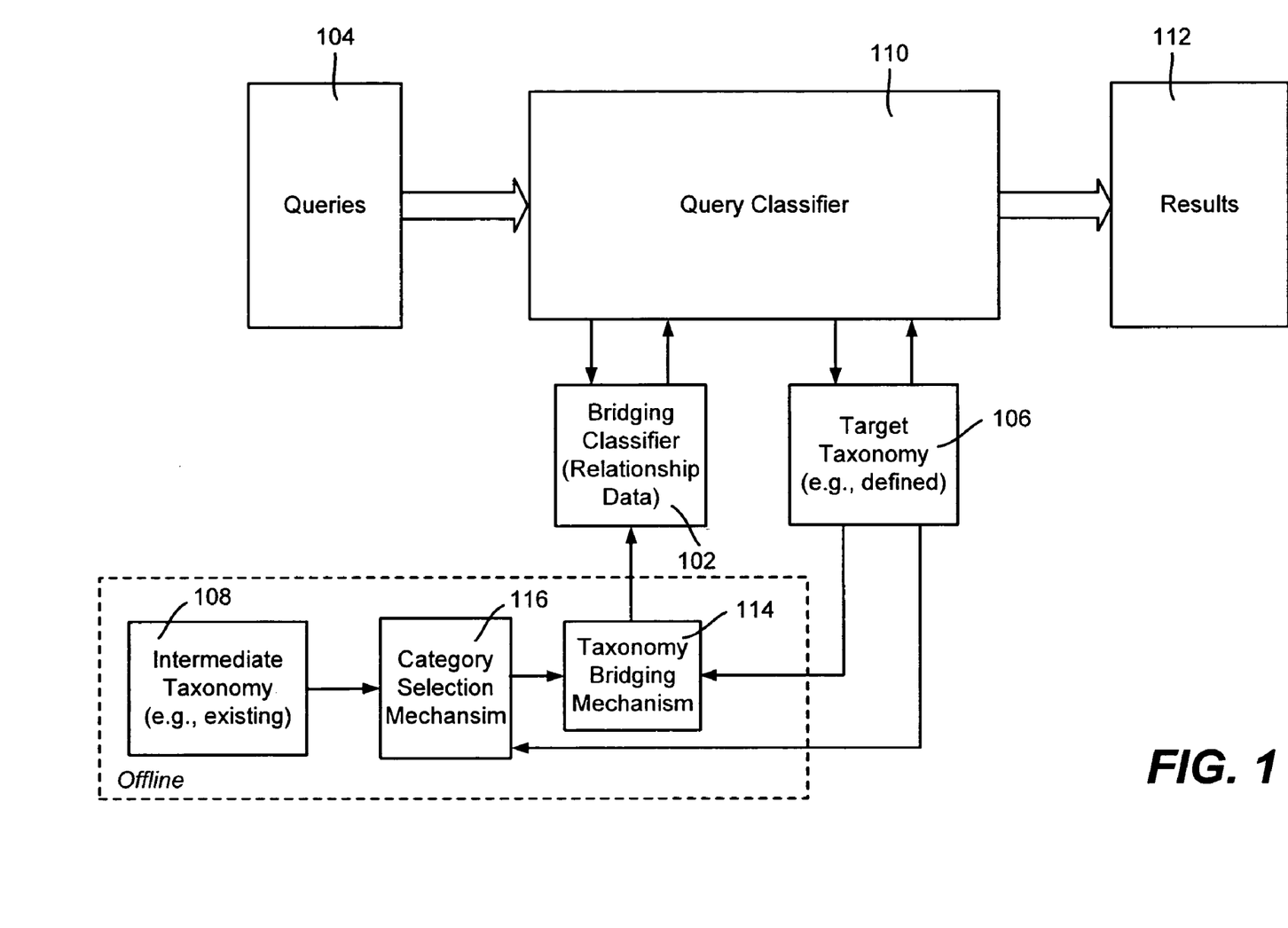
FIG. 1 is a block diagram representing an example system for using an intermediate taxonomy as a bridge to a target taxonomy.

FIG. 1 represents example components including a bridging classifier 102 that couples queries 104 to a target taxonomy 106 by using data obtained from an intermediate taxonomy 108 as a bridge. The target taxonomy 106 and the bridging classifier 102 can be associated with (or incorporated into) a query classifier 110 or the like that outputs a result set 112, such as a set of advertisements relevant to each received query.

In one example implementation, the intermediate (e.g., existing) taxonomy 108 is processed against the (e.g., defined) target taxonomy by a taxonomy bridging mechanism 114 to build the bridging classifier 102. However, because the intermediate taxonomy can be enormous, a category selection mechanism 116 (described below) can be used to determine a reduced subset of categories in the intermediate taxonomy 108, based on relevance to the target taxonomy 106.

Figure 2:
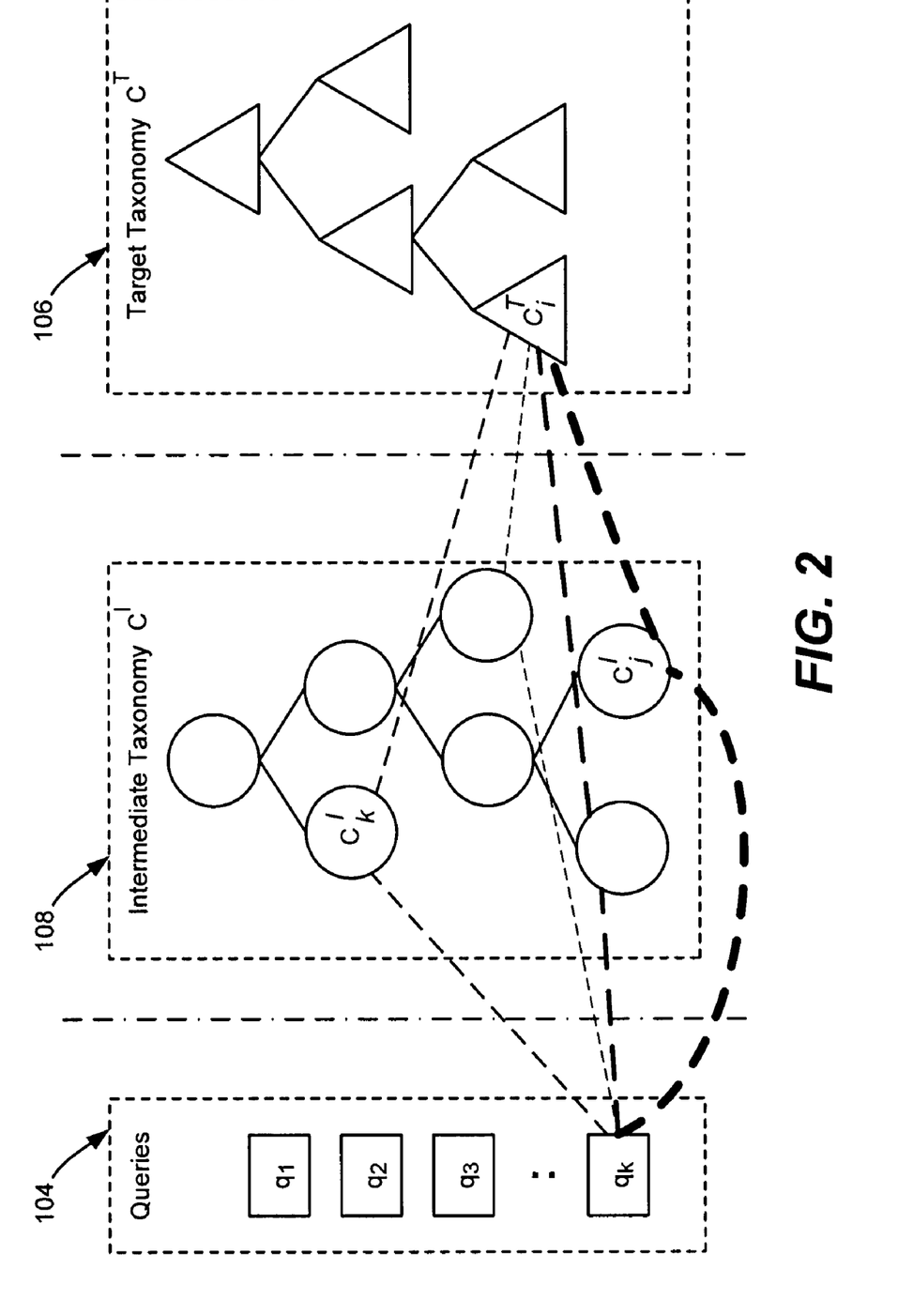
FIG. 2 is a representation of query being processed by use of an intermediate taxonomy as a bridge to a target taxonomy.

An example of the general concept of is represented in FIG. 2, where two vertical lines separate the data and various aspects into three parts. The blocks in the left part 104 denote queries $q_1$-$q_k$ to be classified; the data structure (e.g., tree) in the right part represents the target taxonomy 104 (also referred to as $C^T$); and the tree in the middle part is an existing intermediate taxonomy 108 (also referred to as $C^I$).

In FIG. 2, the thickness of the dotted lines reflects the similarly relationship between queries and nodes in the intermediate taxonomy 108 and the target taxonomy 106; (that is, the thicker the dashed line, the more similar the relationship). For example, as represented by the relative thicknesses of the dashed lines, the relationship between $C_i^T$ and $C_j^I$ is represented as being stronger than the relationship between $C_i^T$ and $C_k^I$.

To determine similarity of relationships, given a category $C_i^T$ in the target taxonomy and a query to be classified $q_k$, the similarity between them may be determined by the distributions of their relationship to the categories in the intermediate taxonomy 108 ($C^I$). In one example implementation, the relationship and similarity may be defined under a probabilistic framework by the following equation:

$$p(C_i^T|q) = \sum_{C_j^I} p(C_i^T, C_j^I|q)$$

$$= \sum_{C_j^I} p(C_i^T|C_j^I, q)p(C_j^I|q)$$

$$\approx \sum_{C_j^I} p(C_i^T|C_j^I)p(C_j^I|q)$$

$$= \sum_{C_j^I} p(C_i^T|C_j^I)\frac{p(q|C_j^I)p(C_j^I)}{p(q)}$$

$$\propto \sum_{C_j^I} p(C_i^T|C_j^I)p(q|C_j^I)p(C_j^I)$$

In the above equation, $p(C_i^T|q)$ denotes the conditional probability of a node i in the target taxonomy 106 ($C_i^T$) given a query q. Similarly, $p(C_i^T|C_j^I)$ and $p(q|C_j^I)$ denote the probability of $C_i^T$ and q, given $C_j^I$ respectively. The prior probability of $C_j^I$ is $p(C_j^I)$, which can be estimated from the web pages in the intermediate taxonomy 108 (classifier $C^I$).

If $C_i^T$ corresponds to a set of words ($w_1, w_2, \ldots w_n$) where each word $w_k$ appears $n_k$ times, $p(C_i^T|C_j^I)$ can be calculated via the following equation:

$$p(C_i^T|C_j^I) = \Pi_{k=1}^n p(w_k|C_j^I)^{n_k}$$

where $p(w_k|C_j^I)$ stands for the probability that the word $w_k$ occurs in class $C_j^I$, which can be estimated by the principle of maximal likelihood. Note that $p(q|C_j^I)$ can be calculated in the same way as $p(C_i^T|C_j^I)$.

Then, a query q can be classified with respect to a node in the target taxonomy according to the following equation:

$$c^* = \underset{C_i^T}{\operatorname{argmax}} p(C_i^T|q)$$

Turning to the aspects directed towards category selection, the intermediate taxonomy 108 may contain an enormous number of categories, with some of them irrelevant to a query classification task corresponding to a particular predefined target taxonomy 106 (e.g., a target taxonomy related to advertisements). As a result, to reduce the computation complexity, a process referred as "category selection" may be performed.

One example approach to evaluate the relevance of a given category in the intermediate taxonomy 108 uses a total probability technique, while another example approach is directed to a mutual information technique. Each of these example approaches is described below. Note that in these example approaches, category selection may be performed by selecting some number (the top N) categories after sorting the categories according to the scores calculated by the example approaches.

One example category selection process is referred to as the total probability approach, which gives a score to each category in the intermediate taxonomy 108 according to its probability of generating the categories in the target taxonomy 106, as shown below. Note that $\hat{P}(C_i^T|C_j^I)$ is not normalized over $C_i^T$.

$$\operatorname{Score}(C_j^I) = \sum_{C_i^T} \hat{p}(C_i^T|C_j^I)$$

Another example category selection process, the mutual information approach, is based on mutual information, a criterion commonly used in statistical language modeling of word associations and other related applications. For example, given a word t and a category c, the mutual information between t and c may be defined as:

$$MI(t, c) = \log \frac{P(t \wedge c)}{P(t) \times P(c)}$$

Because a name of a category in the target taxonomy 106 usually contains more than one term, the "mutual information" between a category $C_j^I$ in the intermediate taxonomy 108 and a category $C_i^T$ in the target taxonomy 106 is defined as:

$$MI(C_i^T, C_j^I) = \frac{1}{|C_i^T|} \sum_{t \in C_i^T} MI(t, C_j^I)$$

where $|C_i^T|$ is the number of terms in the name of $C_i^T$.

To measure the relevance of $C_j^I$ in a global category selection, the category-specific scores of $C_j^I$ is combined by:

$$MI_{avg}(C_j^I) = \sum_{C_j^T} MI(C_i^T, C_j^I)$$

Figure 3:
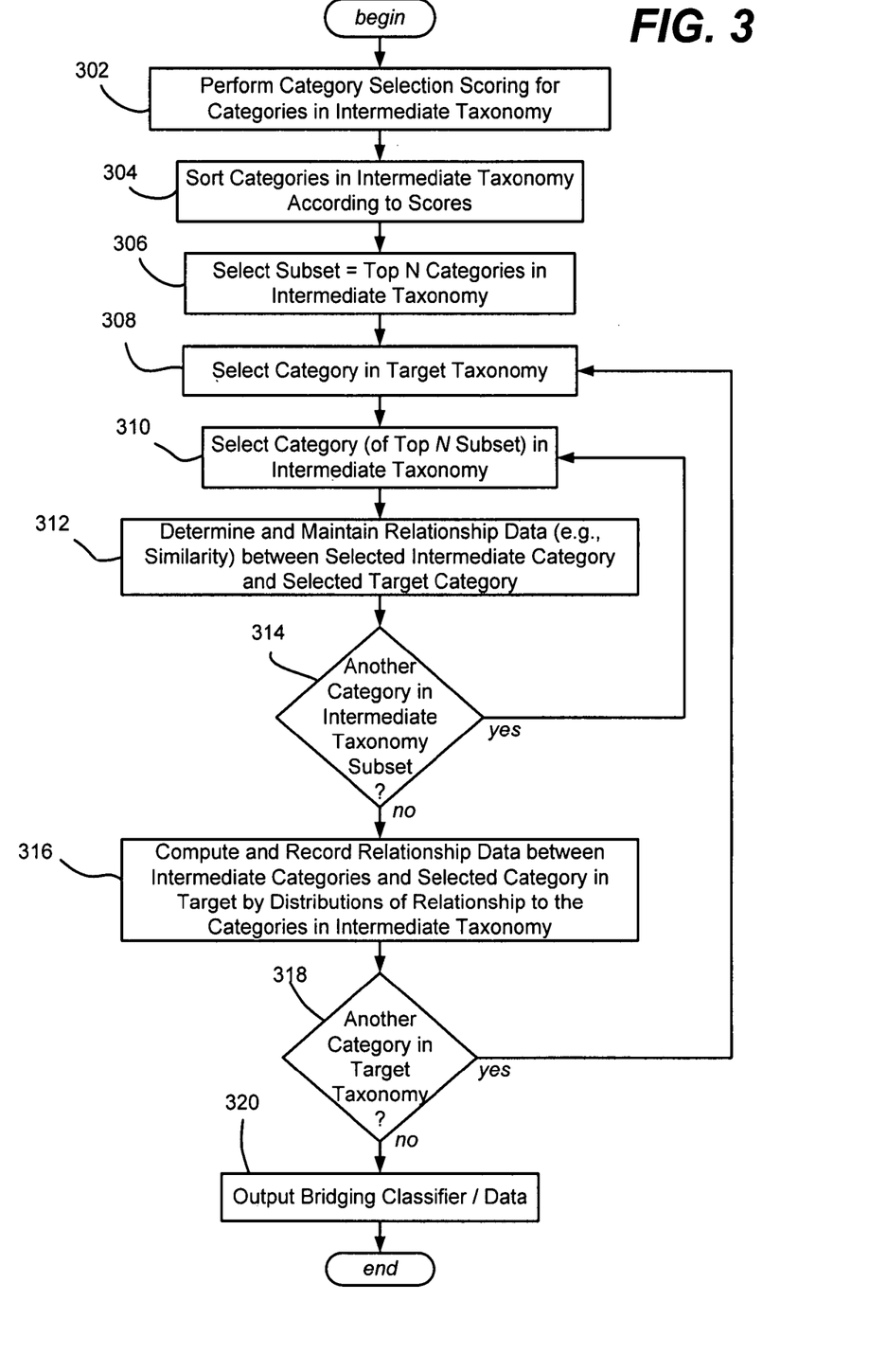
FIG. 3 is a flow diagram representing example steps taken to use an intermediate taxonomy as a bridge to a target taxonomy via a bridging classifier.

FIG. 3 is a flow diagram comprising example steps that summarize the various aspects related to building the bridging classifier, e.g., offline with respect to query processing. Steps 302, 304 and 306 are directed towards category selection, e.g., determining the subset of the categories in the intermediate taxonomy that are relevant to a given target taxonomy. Step 302 represents the scoring of each category, using the total probability technique, the mutual information technique, some combination thereof, and/or an equivalent technique for scoring relevance. Step 304 sorts the categories according to the scores, and step 306 selects a subset based on the scores, e.g., the top N categories.

Step 308 represents selecting a category in the target taxonomy for evaluation against the subset of categories from the intermediate taxonomy. As can be seen, each category in the intermediate taxonomy subset is selected (via steps 310 and 314) to compute its associated relationship (similarity/probability) value with the currently selected node in the target taxonomy. Step 316 mathematically combines the values in some way into a relationship value, such as described above. Step 318 repeats the process for other nodes in the target taxonomy.

The result is bridging classifier data that can be related to an online query to map the query into a node (or nodes) in the target taxonomy based on the recorded relationship values.

Figure 4:
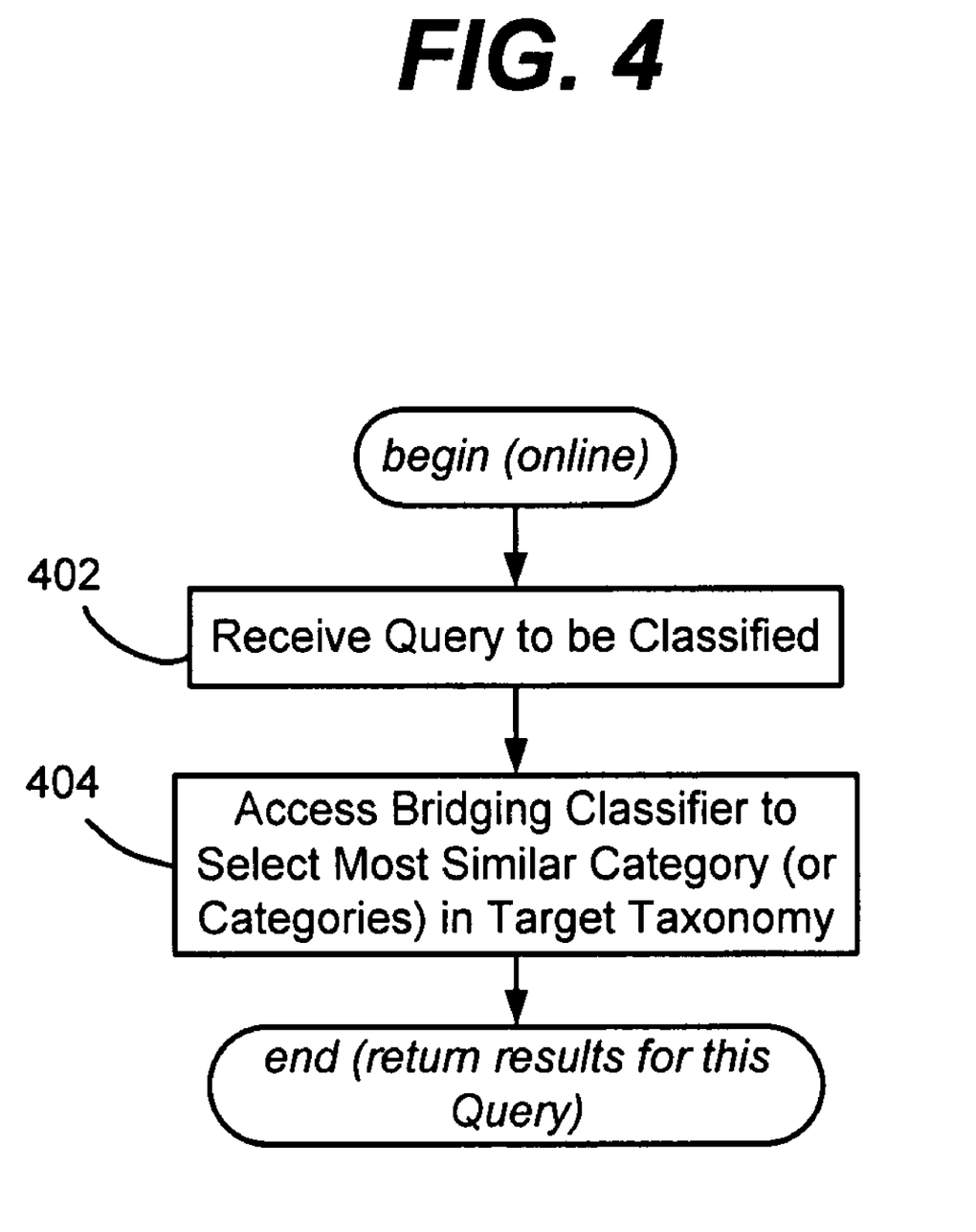
FIG. 4 is a flow diagram representing example steps taken to use a bridging classifier to locate data in a target taxonomy for providing results to a query.

FIG. 4 represents the online processing of a query, received at step 402. As can be readily appreciated, at step 404, the query can be mapped to the target taxonomy using the relationship data obtained from the bridging classifier that was constructed from the intermediate taxonomy.

Exemplary Operating Environment

Figure 5:
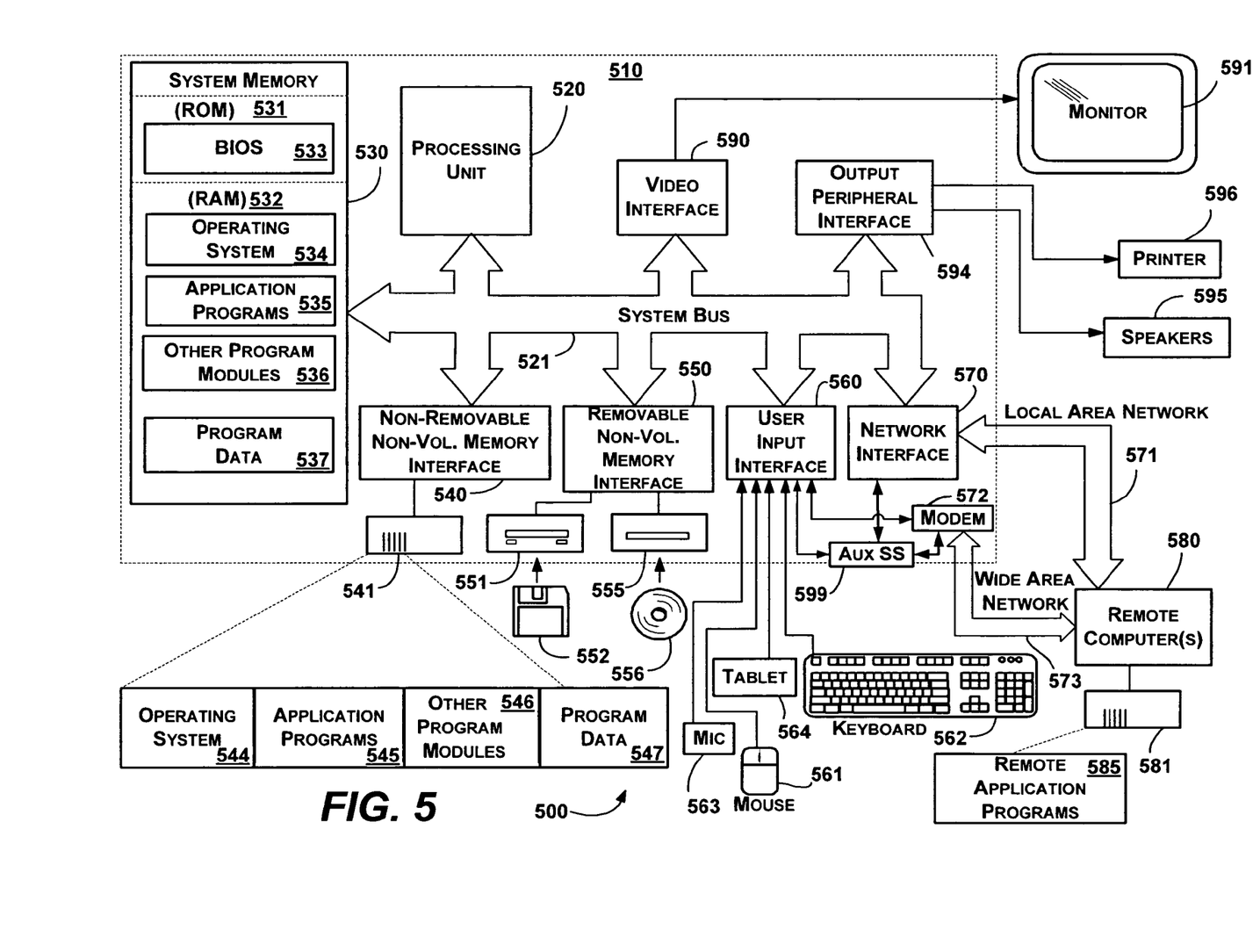
FIG. 5 shows an illustrative example of a general-purpose network computing environment into which various aspects of the present invention may be incorporated.

FIG. 5 illustrates an example of a suitable computing system environment 500 on which the examples represented in FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
processing an intermediate taxonomy with respect to a target taxonomy to determine relationship values between intermediate taxonomy categories represented in the intermediate taxonomy and target taxonomy categories represented in the target taxonomy;
selecting a subset of selected categories from the intermediate taxonomy categories based on a relevance of individual selected categories to individual target taxonomy categories, wherein selecting the subset comprises computing one or more scores for the individual intermediate taxonomy categories and selecting the subset of selected categories based at least in part on the one or more scores, and wherein the one or more scores for the individual intermediate taxonomy categories comprise at least one probability score that corresponds to a probability of at least one intermediate taxonomy category generating one or more of the target taxonomy categories; and using the relationship values to provide a bridging classifier for use in an online query processing state that relates a query to at least one of the target taxonomy categories based on individual target taxonomy category relationships to individual selected categories.

2. The method of claim 1 wherein processing the intermediate taxonomy occurs in an offline state relative to the online query processing state.

3. In a computing environment, a system comprising:

a category selection mechanism coupled to an intermediate taxonomy and a target taxonomy and configured to select a subset of intermediate taxonomy categories represented in the intermediate taxonomy based on relevance to target taxonomy categories represented in the target taxonomy, wherein the category selection mechanism is configured to compute the relevance based on relative probability scores between the intermediate taxonomy categories and the target taxonomy categories, individual relative probability scores corresponding to a probability of a corresponding intermediate taxonomy category generating one or more of the target taxonomy categories;

a taxonomy bridging mechanism configured to process the subset of intermediate taxonomy categories to construct a bridging classifier for use in relating online queries to individual target taxonomy categories in the target taxonomy, the taxonomy bridging mechanism configured to determine relationship values between one or more of the intermediate taxonomy categories and one or more of the target taxonomy categories to construct the bridging classifier a computing device configured to implement at least one of the category selection mechanism or the taxonomy bridging mechanism.

4. The system of claim 3 wherein the category selection mechanism is further configured to compute the relevance based on mutual information scores between the intermediate taxonomy categories and the target taxonomy categories.

5. The system of claim 3 wherein the category selection mechanism operates in an offline state relative to the taxonomy bridging classifier relating the online queries to the individual target taxonomy categories in the target taxonomy.

6. The system of claim 3 wherein the taxonomy bridging mechanism operates in an offline state relative to the taxonomy bridging classifier relating the online queries to the individual target taxonomy categories in the target taxonomy.

7. The system of claim 3 wherein at least one of the intermediate taxonomy or the target taxonomy comprises a tree of category-corresponding nodes.

8. A computer-readable storage medium having computer-executable instructions, which when executed perform steps, comprising:

determining relationship values between intermediate taxonomy categories represented in an intermediate taxonomy and target taxonomy categories represented in a target taxonomy;

selecting a subset of intermediate taxonomy categories represented in the intermediate taxonomy based on relevance to the target taxonomy categories represented in the target taxonomy, wherein the selecting the subset comprises:

computing one or more relative probability scores between the intermediate taxonomy categories and the target taxonomy categories, individual relative probability scores corresponding to a probability of a corresponding intermediate taxonomy category generating one or more of the target taxonomies; and selecting the subset based on the one or more relative probability scores;

processing the subset of intermediate categories to construct a bridging using the relationship values; and receiving an online query and utilizing the bridging classifier to locate an individual target taxonomy category.

9. The computer-readable storage medium of claim 8, wherein determining the individual target category as the function of the conditional probability comprises determining the individual target category c* according to:

$$c^* = \underset{C_i^T}{\operatorname{argmax}} p(C_i^T | q)$$

wherein given a query q, $p(C_i^T|q)$ denotes the conditional probability of a node i in the target taxonomy as determined from the intermediate taxonomy, and $C_i^T$ corresponds to a set of words $(w_1, w_2, \ldots w_n)$ in the target taxonomy where each word $w_k$ appears $n_k$ times.

10. The computer-readable storage medium of claim 8, wherein utilizing the bridging classifier to locate an individual target taxonomy category includes determining the individual target category as a function of a conditional probability of a node in the target taxonomy as determined from the intermediate taxonomy.

* * * * *

UNITED STATES PATENT AND TRADEMARK OFFICE
CERTIFICATE OF CORRECTION

PATENT NO.         : 7,774,360 B2                                          Page 1 of 1
APPLICATION NO.    : 11/799223
DATED              : August 10, 2010
INVENTOR(S)        : Jian-Tao Sun et al.

It is certified that error appears in the above-identified patent and that said Letters Patent is hereby corrected as shown below:

Claims 9 and 10 (formerly claims 14 and 23) are reversed.
Col. 10, claim 9, line 1, please delete "9." and insert therefor --10.-- and please delete "claim 8" and insert therefor --claim 9--.
Col. 10, claim 10, line 1, please delete "10." and insert therefor --9.--.

Signed and Sealed this
Sixteenth Day of October, 2012

David J. Kappos
*Director of the United States Patent and Trademark Office*

UNITED STATES PATENT AND TRADEMARK OFFICE
CERTIFICATE OF CORRECTION

PATENT NO.       : 7,774,360 B2                                Page 1 of 1
APPLICATION NO.  : 11/799223
DATED            : August 10, 2010
INVENTOR(S)      : Jian-Tao Sun et al.

It is certified that error appears in the above-identified patent and that said Letters Patent is hereby corrected as shown below:

Claims 9 and 10 (formerly claims 14 and 23) are reversed.
Column 10, line 29 (claim 9, line 1) please delete "9." and insert therefor --10.-- and please delete "claim 8" and insert therefor --claim 9--.
Column 10, line 44 (claim 10, line 1) please delete "10." and insert therefor --9.--.

This certificate supersedes the Certificate of Correction issued October 16, 2012.

Signed and Sealed this
Thirteenth Day of November, 2012

David J. Kappos
*Director of the United States Patent and Trademark Office*